(12) United States Patent
Ito et al.

(10) Patent No.: US 10,600,378 B2
(45) Date of Patent: Mar. 24, 2020

(54) LIQUID CRYSTAL DRIVING DEVICE

(71) Applicant: Rohm Co., Ltd., Kyoto (JP)

(72) Inventors: Sukenori Ito, Kyoto (JP); Akira Hashimoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 7 days.

(21) Appl. No.: 16/081,309

(22) PCT Filed: Feb. 8, 2017

(86) PCT No.: PCT/JP2017/004590
§ 371 (c)(1),
(2) Date: Aug. 30, 2018

(87) PCT Pub. No.: WO2017/150116
PCT Pub. Date: Sep. 8, 2017

(65) Prior Publication Data
US 2019/0088219 A1    Mar. 21, 2019

(30) Foreign Application Priority Data
Mar. 1, 2016 (JP) .................................. 2016-038990

(51) Int. Cl.
| | |
|---|---|
| *G09G 3/00* | (2006.01) |
| *G09G 3/36* | (2006.01) |
| *B60K 37/02* | (2006.01) |
| *B60K 35/00* | (2006.01) |
| *G02F 1/133* | (2006.01) |

(52) U.S. Cl.
CPC ........... *G09G 3/3614* (2013.01); *B60K 35/00* (2013.01); *B60K 37/02* (2013.01);
(Continued)

(58) Field of Classification Search
CPC .... G09G 3/006; G09G 3/3696; G09G 3/3614; G09G 3/3659; G09G 3/3685;
(Continued)

(56) References Cited

U.S. PATENT DOCUMENTS 6,023,774 A * 2/2000 Minagawa .......... G06F 11/1443
370/242
6,816,143 B1 11/2004 Lambert
(Continued)

FOREIGN PATENT DOCUMENTS

JP   2001-345928 A   12/2001
JP   2003-248468 A    9/2003
(Continued)

OTHER PUBLICATIONS

Japan Patent Office, International Search Report for International Application No. PCT/JP2017/004590 dated May 16, 2017 (with English translation).

*Primary Examiner* — Dismery Mercedes
(74) *Attorney, Agent, or Firm* — Fish & Richardson P.C.

(57) ABSTRACT

A liquid-crystal driving device is formed by integrating: an external output terminal to which a source line of an LCD panel is exteriorly connected; a first driver which generates a first source signal having three or more gradations (for example, 256 gradations) and outputs the first source signal to the external output terminal; an abnormality detection unit (a logic unit and an output monitor unit) which detects an abnormality in the first source signal; and a second driver which, when an abnormality in the first source signal is detected, generates a second source signa) having two gradations and outputs the second source signal to the external output terminal. The LCD panel is driven in a predetermined polarity inversion drive system, and the abnormality detection unit, for example, monitors polarity inversion of the first source signal in a fly-back period and detects an abnormality in the first source signal.

10 Claims, 11 Drawing Sheets

(52) U.S. Cl.
CPC ......... *G02F 1/13306* (2013.01); *G09G 3/006* (2013.01); *G09G 3/3685* (2013.01); *B60K 2370/1523* (2019.05); *G09G 2330/08* (2013.01); *G09G 2330/12* (2013.01); *G09G 2380/10* (2013.01)

(58) Field of Classification Search
CPC ............... G09G 3/3233; G09G 3/3629; G09G 2330/12; G09G 2310/0286; B60K 2370/1523; B60K 37/02; G02F 1/13306
See application file for complete search history.

(56) References Cited

U.S. PATENT DOCUMENTS

| | | | |
|---|---|---|---|
| 7,619,620 B2 * | 11/2009 | Fujita | G09G 3/006 345/204 |
| 8,698,720 B2 * | 4/2014 | Kaneda | G09G 3/3696 345/87 |
| 9,583,037 B2 * | 2/2017 | Omoto | G09G 3/30 |
| 9,620,075 B2 * | 4/2017 | Kobayashi | G09G 3/3696 |
| 9,761,184 B2 * | 9/2017 | Kim | G09G 3/3607 |
| 10,176,773 B2 * | 1/2019 | Iwasaki | G09G 3/3648 |
| 10,388,209 B2 * | 8/2019 | Kadota | G09G 3/2096 |
| 2003/0025658 A1 | 2/2003 | Janssen et al. | |
| 2003/0122773 A1 | 7/2003 | Washio et al. | |
| 2003/0142363 A1 * | 7/2003 | Oota | G09G 3/2092 358/401 |
| 2004/0029546 A1 | 2/2004 | Tsuchi et al. | |
| 2006/0250384 A1 | 11/2006 | Tsuchi et al. | |
| 2008/0036753 A1 | 2/2008 | Washio et al. | |
| 2011/0148825 A1 | 6/2011 | Ueno | |

FOREIGN PATENT DOCUMENTS

| | | |
|---|---|---|
| JP | 2006-171084 A | 6/2006 |
| JP | 2010-122513 A | 6/2010 |
| WO | 2010/041649 A1 | 4/2010 |

* cited by examiner

LIQUID CRYSTAL DRIVING DEVICE

TECHNICAL FIELD

The present invention relates to liquid crystal driving devices.

BACKGROUND ART

Today, in applications using liquid crystal display panels (hereinafter LCD panels), high reliability is desired not only in liquid crystal display panels themselves but also in liquid crystal driving devices for driving them.

An example of prior art related to what has just mentioned is seen in Patent Document 1 identified below.

List of Citations

PATENT LITERATURE

Patent Document 1: Japanese Patent Application published as No. 2006-171084.

SUMMARY OF THE INVENTION

Technical Problem

Inconveniently, with conventional liquid crystal driving devices, if a fault occurs in a source driver (or a circuit peripheral to it), an LCD panel may go into a state where nothing that is being displayed on it is visually recognizable (including states where the entire LCD panel is extinguished or lit).

In particular, nowadays, vehicle-mounted ICs are required to comply with ISO 26262 (an international standard for functional safety of electrical and/or electronic systems in production automobiles). Thus, also in liquid crystal driving devices, it is important to aim at a fail-safe design in terms of reliability.

In view of the above-mentioned challenges found by the present inventors, the invention disclosed herein is aimed at providing a liquid crystal driving device that can maintain minimal display even in case of a fault in a source driver.

Means for Solving the Problem

According to one aspect of what is disclosed herein, a liquid crystal driving device has the following elements integrated together: an external output terminal to which a source line of a liquid crystal display panel is externally connected; a first driver configured to generate, and output to the external output terminal, a first source signal of three or more gradations; an abnormality detector configured to detect an abnormality in the first source signal; and a second driver configured to generate, and output to the external output terminal, a second source signal of two gradations when an abnormality is detected in the first source signal (a first configuration).

In the liquid crystal driving device of the first configuration described above, preferably, the abnormality detector is configured to detect an abnormality in the first source signal during a flyback period of the liquid crystal display panel (a second configuration).

In the liquid crystal driving device of the second configuration described above, preferably, the liquid crystal display panel is driven by predetermined polarity inversion driving, and the abnormality detector is configured to detect an abnormality in the first source signal by monitoring polarity inversion of the first source signal during the flyback period (a third configuration).

In the liquid crystal driving device of the third configuration described above, preferably, the predetermined polarity inversion driving is one of frame inversion driving, row inversion driving, column inversion driving, and dot inversion driving (a fourth configuration).

In the liquid crystal driving device of any one of the first to fourth configurations described above, preferably, the second driver has a higher withstand voltage than the first driver (a fifth configuration).

The liquid crystal driving device of any one of the first to fifth configurations described above preferably has the following elements further integrated together: a first buffer configured to receive a first input voltage and output a first output voltage; a second buffer configured to receive a second input voltage and output a second output voltage; a first external terminal via which a first capacitor is externally connected to the output terminal of the first buffer; a second external terminal via which a second capacitor is externally connected to the output terminal of the second buffer; a gradation voltage generator configured to receive the first and second output voltages and generate a gradation voltage; and a DAC configured to convert digital video data into an analog video signal by using the gradation voltage and feed the analog video signal to the first driver (a sixth configuration).

In the liquid crystal driving device of the sixth configuration described above, preferably, the second driver is configured to operate by being supplied with the first and second input voltages without these input voltages passing through either of the first and second buffers (a seventh configuration).

In the liquid crystal driving device of any one of the first to seventh configurations described above, preferably, the first driver includes a plurality of first drivers, and the second driver and the abnormality detector are provided to correspond to at least one of the plurality of first drivers (an eighth configuration).

According to another aspect of what is disclosed herein, a liquid crystal display device includes: the liquid crystal driving device of any one of the first to eighth configurations described above; and a liquid crystal display panel that is driven by the liquid crystal driving device (a ninth configuration).

According to yet another aspect of what is disclosed herein, a vehicle includes the liquid crystal display device of the ninth configuration described above (a tenth configuration).

Advantageous Effects of the Invention

According to the invention disclosed herein, it is possible to provide a liquid crystal driving device that can maintain minimal display even in case of a fault in a source driver.

DESCRIPTION OF EMBODIMENTS

<Liquid Crystal Display Device>

Figure 1:
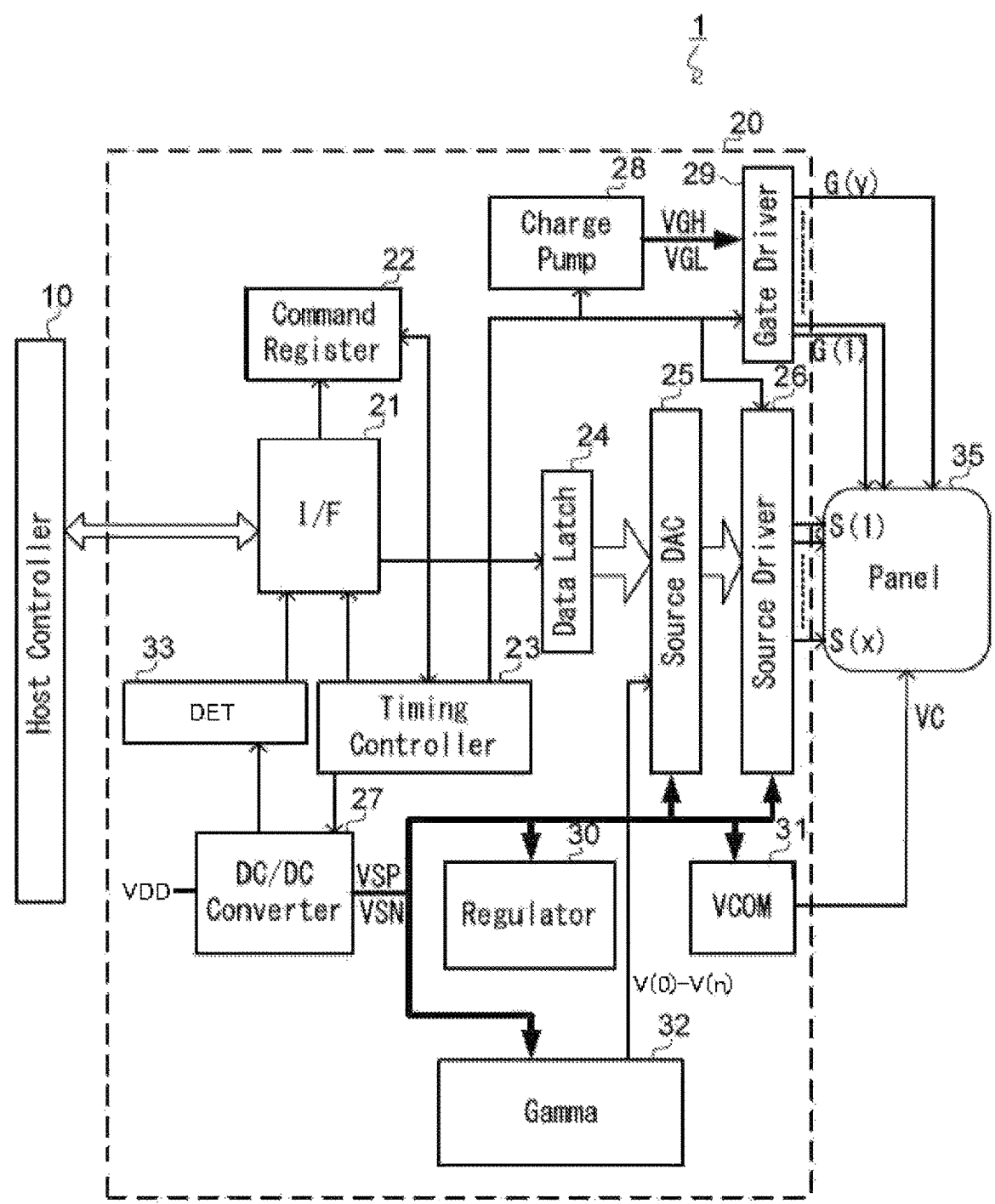
FIG. 1 is a block diagram showing one configuration example of a liquid crystal driving device.

FIG. 1 is a block diagram showing one configuration example of a liquid crystal display device. The liquid crystal display device 1 of this configuration example includes an LCD (liquid crystal display) driver 20 and an LCD panel 35.

The LCD driver 20 drives and controls the LCD panel 35 based on a video signal, and various commands, that are fed in from a host controller 10 (such as a microprocessor).

The LCD panel 35 is a video outputting means that uses liquid crystal elements as pixels, and is driven as a load of the LCD driver 20.

<LCD Driver>

With reference still to FIG. 1, the LCD driver 20 will be described in detail. The LCD driver 20 includes an interface 21, a command register 22, a timing controller 23, a data latch 24, a source DAC (D-A converter) 25, a source driver 26, a DC-DC converter 27, a charge pump 28, a gate driver 29, a regulator 30, a common voltage generator 31, a gamma voltage generator 32, and an abnormality detector 33. The LCD driver 20 is a semiconductor device (IC) that has the just enumerated elements integrated into a single chip.

The interface 21 serves to exchange data with a host controller 10; for example, it receives video data, various commands, and the like from the host controller 10, and transmits detection results from the abnormality detector 33 to the host controller 10.

The command register 22 stores various commands fed in from the host controller 10 via the interface 21.

The timing controller 23 performs various kinds of timing control in the LCD driver 20 based on the commands stored in the command register 22. For example, the timing controller 23 performs synchronizing control for the gate driver 29 and the source driver 26.

The data latch 24 latches the video data fed in from the host controller 10 via the interface 21, and then outputs the video data to the source DAC 25.

The source DAC 25 operates by being supplied with a positive supply voltage VSP and a negative supply voltage VSN. The source DAC 25 performs digital-to-analog conversion on digital (m-bit) video data that is latched in and then fed from the data latch 24, and thereby generates an analog video signal.

The source driver 26 operates by being supplied with the positive and negative supply voltages VSP and VSN. The source driver 26 converts the analog video signal fed from the source DAC 25 into source signals S(1) to S(x). The source signals S(1) to S(x) are fed to the liquid crystal elements of the LCD panel 35 (in a case where the LCD panel 35 is of an active matrix type, to the source terminals of the active elements that are respectively connected to the liquid crystal elements).

The DC-DC converter 27 is a switching power supply circuit that includes a positive step-up converter, which positively steps up an input voltage VDD to generate the positive supply voltage VSP, and a negative step-up converter, which negatively steps up the input voltage VDD to generate the negative supply voltage VSN. The positive and negative supply voltages VSP and VSN are supplied to the source DAC 25, the source driver 26, the regulator 30, the common voltage generator 31, the gamma voltage generator 32, and the like.

The charge pump 28 drives a flying capacitor in synchronism with a clock signal fed from the timing controller 23, and thereby steps up a predetermined reference voltage by a predetermined step-up factor to generate a desired positive step-up voltage VGH and a desired negative step-up voltage VGL.

The gate driver 29 operates by being supplied with the positive and negative step-up voltages VGH and VGL. The gate driver 29 generates gate signals G(1) to G(y) for the LCD panel 35 based on a synchronizing signal fed from the timing controller 23. The gate signals G(1) to G(y) are fed to the liquid crystal elements of the LCD panel 35 (in a case where the LCD panel 35 is of an active matrix type, to the gate terminals of the active elements that are respectively connected to the liquid crystal elements).

The regulator 30 steps down the positive and negative supply voltages VSP and VSN individually to generate different internal voltages.

The common voltage generator 31 steps down the negative supply voltage VSN to generate a common voltage VC, and feeds it to the liquid crystal elements of the LCD panel 35 (in a case where the LCD panel 35 is of an active matrix type, to the drain terminals of the active elements that are respectively connected to the liquid crystal elements).

The gamma voltage generator 32 operates by being supplied with the positive and negative supply voltages VSP and VSN. The gamma voltage generator 32 generates gamma voltages V(0) to V(n) of $2^m$ gradations (where $n=2^m-1$), and feeds them to the source DAC 25. The gamma voltages V(0) to V(n) correspond one-to-one to the data values "0" to "n" in the video data fed to the source DAC 25.

The abnormality detector 33 monitors the operation of the DC-DC converter 27 to watch for a fault in the display operation in the LCD panel 35.

Source Driver and Surrounding Circuits (First Embodiment)

Figure 2:
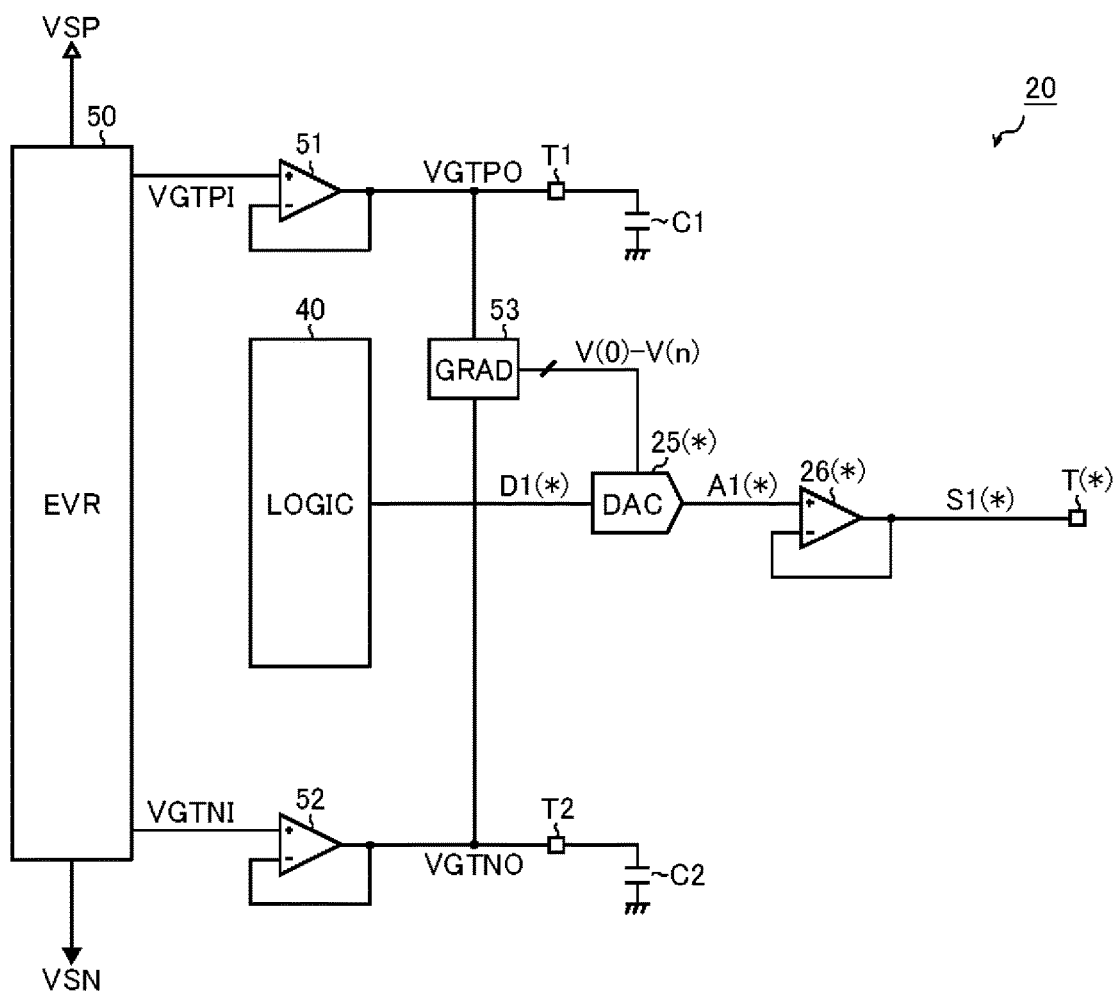
FIG. 2 is a block diagram of a source driver and circuits surrounding it according to a first embodiment.

FIG. 2 is a block diagram of the source driver 26 and circuits surrounding it according to a first embodiment. In this embodiment, the LCD driver 20 has, as elements peripheral to the source driver 26 described previously with reference to FIG. 1, DACs 25(*) (where *=1, 2, ... x, which applies throughout the description), first drivers 26(*), a logic circuit 40, an EVR (electric variable resistor) 50, buffers 51 and 52, a gradation voltage generator 53, external output terminals T(*), and external terminals T1 and T2.

The DACs 25(*) are circuit elements that respectively form the channels of the source DAC 25 in FIG. 1. The DACs 25(*), by using gradation voltages V(0) to V(n) (corresponding to the previously-mentioned gamma voltages V(0) to V(n)), convert the m-bit (for example, 8-bit) digital video data D1(*) into analog video signals A1(*) of $2^m$ gradations (for example, 256 gradations), and feed the results to the first drivers 26(*).

The first drivers 26(*) are circuit elements that respectively form the channels of the source driver 26 in FIG. 1. The first drivers 26(*), by receiving the analog video signals A1(*), generate first source signals S1(*), and output these to the external output terminals T(*). To the external output terminals T(*), the source leads of the LCD panel 35 are connected externally.

The logic circuit 40 is a circuit element that corresponds to the interface 21, the command register 22, the timing controller 23, the data latch 24, and the like in FIG. 1. The logic circuit 40 feeds the digital video data D1(*) to the DACs 25(*).

The EVR 50 is a kind of electronic potentiometer that operates by being supplied with the positive and negative supply voltages VSP and VSN. According to a set value stored in the command register 22, the EVR 50 generates a given positive input voltage VGTPI (GND<VGTPI≤VSP) and a given negative input voltage VGTNI (VSN≤VGTNI<GND) individually.

The buffer 51 receives the positive input voltage VGTPI, and outputs a positive output voltage VGTPO. The output terminal of the buffer 51 is connected to the external terminal T1. To the external terminal T1, a capacitor C1 for smoothing the positive output voltage VGTPO is externally connected.

The buffer 52 receives the negative input voltage VGTNI, and outputs a negative output voltage VGTNO. The output terminal of the buffer 52 is connected to the external terminal T2. To the external terminal T2, a capacitor C2 for smoothing the negative output voltage VGTNO is externally connected.

The gradation voltage generator 53 receives the positive and negative output voltages VGTPO and VGTNO, and generates gradation voltages V(0) to V(n). Specifically, of the gradation voltages V(0) to V(n), the maximum and minimum values equal, for example, VGTPO and VGTNO respectively.

The EVR 50, the buffers 51 and 52, and the gradation voltage generator 53 described above can be understood as circuit elements that constitute the gamma voltage generator 32 in FIG. 1.

With the LCD driver 20 of this embodiment, by smoothing the positive and negative output voltages VGTPO and VGTNO with the externally fitted capacitors C1 and C2 respectively, it is possible to suppress power fluctuation in the gradation voltage generator 53. It is thus possible to generate the gradation voltages V(0) to V(n) accurately, and hence to enhance the display definition of the LCD panel 35.

However, in the LCD driver 20 of this embodiment, not only are the output terminals of the first drivers 26(*) connected to the external output terminals T(*), but also the output terminals of the buffers 51 and 52 are connected to the external terminals T1 and T2. Thus, the first drivers 26(*) and the buffers 51 and 52 are somewhat vulnerable to extraneous surges, and if any of these circuit elements is destroyed, the LCD panel 35 may go into a state where nothing that is being displayed on the LCD panel 35 is visually recognizable (which may be a state where the entire LCD panel 35 is extinguished or lit).

In the following description, a second embodiment will be proposed that can perform backup operation properly even in case any of the first drivers 26(*) and the buffers 51 and 52 is destroyed.

Source Driver and Surrounding Circuits (Second Embodiment)

Figure 3:
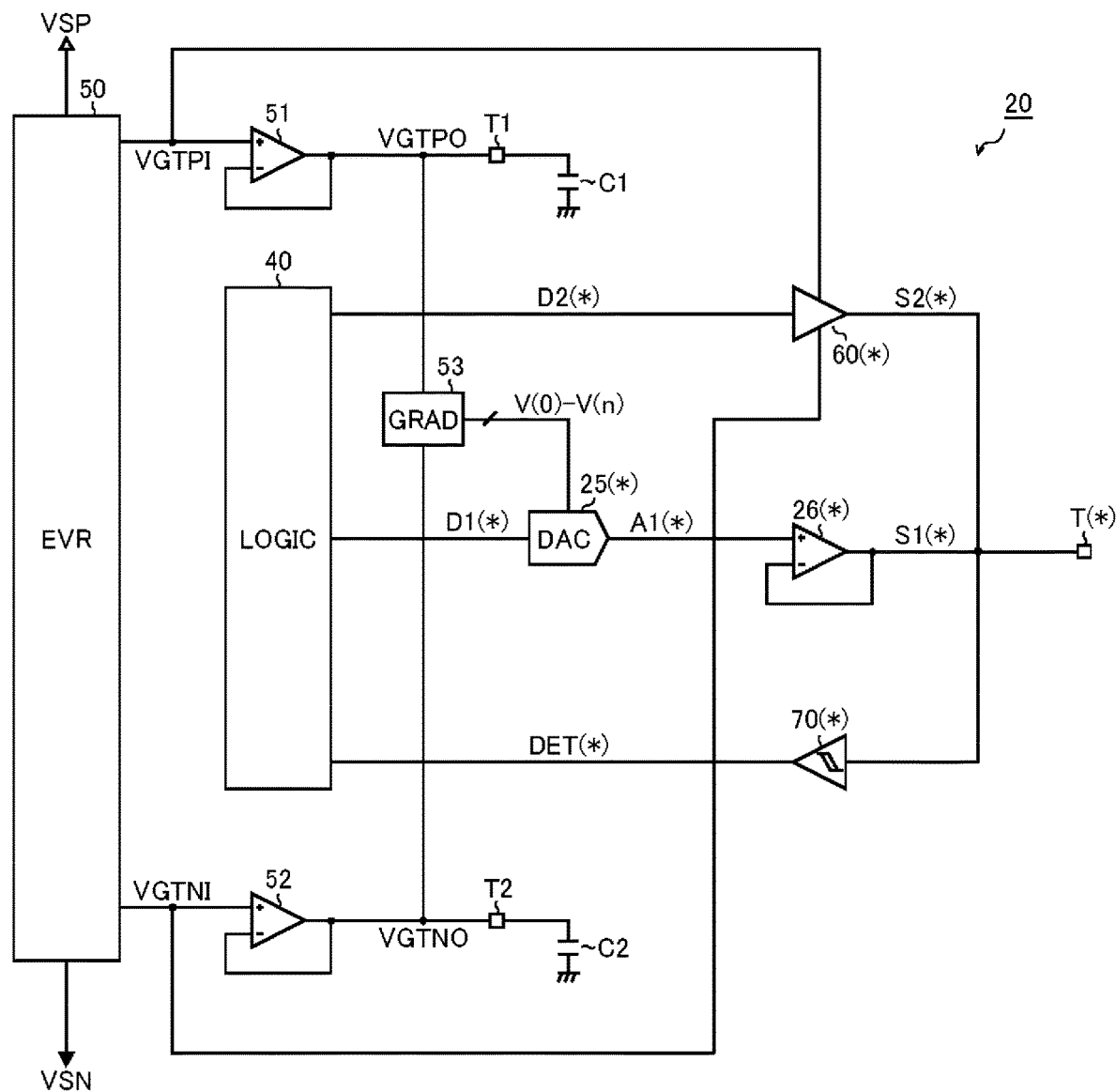
FIG. 3 is a block diagram of a source driver and circuits surrounding it according to a second embodiment.

FIG. 3 is a block diagram of the source driver 26 and circuits surrounding it according to a second embodiment. In this embodiment, the LCD driver 20, while being based on the previously described first embodiment (FIG. 2), further includes second drivers 60(*) and output monitors 70(*). Accordingly, such components as have their counterparts in the first embodiment are identified by the same reference signs as in FIG. 2, and no overlapping description will be repeated; the following description focuses on features unique to the second embodiment.

The second drivers 60(*) are emergency drivers that operate by being supplied with the positive and negative input voltages VGTPI and VGTNI without these voltage passing through the buffers 51 and 52, and operate, specifically, as follows. When an abnormality is detected in the first source signals S1(*), the second drivers 60(*) receive one-bit digital video data D2(*) directly from the logic circuit 40 to generate second source signals S2(*) of two gradations (a high level (VGTPI) and a low level (VGTNI)), and feed these to the external output terminals T(*).

With this configuration, even if any of the first drivers 26(*) and the buffers 51 and 52 is destroyed, it is possible, by using the second drivers 60(*), to continue to output the second source signals S2(*). That is, it is possible to maintain, though with a minimal display definition (in black and white or in eight colors), information display on the LCD panel 35. It is thus possible to prevent a state where nothing that is being displayed on the LCD panel 35 is visually recognizable.

As the second drivers 60(*), it is preferable to use simple one-bit drivers (such as inverters). With this configuration, even adding the second drivers 60(*) for all channels only requires a minimal increase in the chip area.

The positive and negative input voltages VGTPI and VGTNI supplied to the second drivers 60(*) are not smoothed by the externally fitted capacitors C1 and C2. This, however, does not pose any major problem because the driving of the second drivers 60(*) does not require very high accuracy in the supplied power.

The second drivers 60(*) are connected to the external output terminals T(*), and are thus, like the first drivers 26(*), exposed to extraneous surges. To save the second drivers 60(*) from destruction even in case any of the first drivers 26(*) are destroyed, it is preferable that the second drivers 60(*) be given a higher withstand voltage than the first drivers 26(*).

Though not expressly illustrated, buffers may be interposed between the application terminal of the positive input voltage VGTPI and the second drivers 60(*) and between the application terminal of the negative input voltage VGTNI and the second drivers 60(*). In that case, so that the output terminals of those buffers may not be exposed to extraneous surges, it is preferable that they not be connected to any external terminals but be connected only to the second drivers 60(*).

The logic circuit 40 and the output monitors 70 function as an abnormality detector for detecting an abnormality in the first source signals S1(*) (the halting of an output resulting from the destruction by a surge of any of the first drivers 26(*) and the buffers 51 and 52).

The output monitors 70 are all the time fed with the first source signals S1(*). The output monitors 70 compare the first source signals S1(*) with a predetermined threshold voltage Vth to generate detection signals DET(*), and feed these to the logic circuit 40. As the output monitors 70, it is preferable to use simple Schmitt buffers or inverters. With this configuration, even adding the output monitors 70(*) for all channels only requires a minimal increase in the chip area.

The logic circuit 40 monitors the above-mentioned detection signals DET(*), and watch for an abnormality in the first source signals S1(*) by a predetermined abnormality detection method (which will be described in detail later). On detecting an abnormality, the logic circuit 40, to output the second source signals S2(*) by use of the second drivers 60(*), starts one-bit output of the digital video data D2(*).

As the digital video data D2(*), data obtained by converting the original digital video data D1(*) into black-and-white data or eight-color data may be used, or previously prepared black-and-white or eight-color warning screen data may be used.

The logic circuit 40 may be furnished with a function of notifying the host controller 10 of the detection of the abnormality.

<Polarity Inversion Driving>

Next, prior to a description of the method of abnormality detection by the abnormality detector (chiefly the logic circuit 40), polarity inversion driving of the LCD panel 35 will be described. As is well known, continuing to apply a direct-current voltage to the LCD panel 35 causes the liquid crystal elements to deteriorate, leading to a shortened lifetime. To avoid that, in the LCD panel 35, polarity inversion driving is widely practiced in which the liquid crystal elements are driven while the polarity of the applied voltage is inverted every predetermined period.

Figure 6:
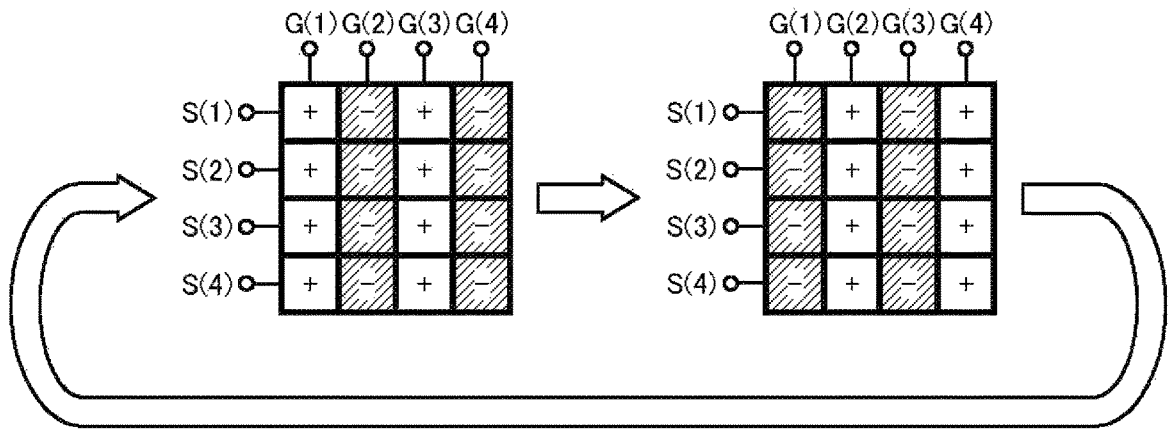
FIG. 6 is a schematic diagram showing column inversion driving.
Figure 7:
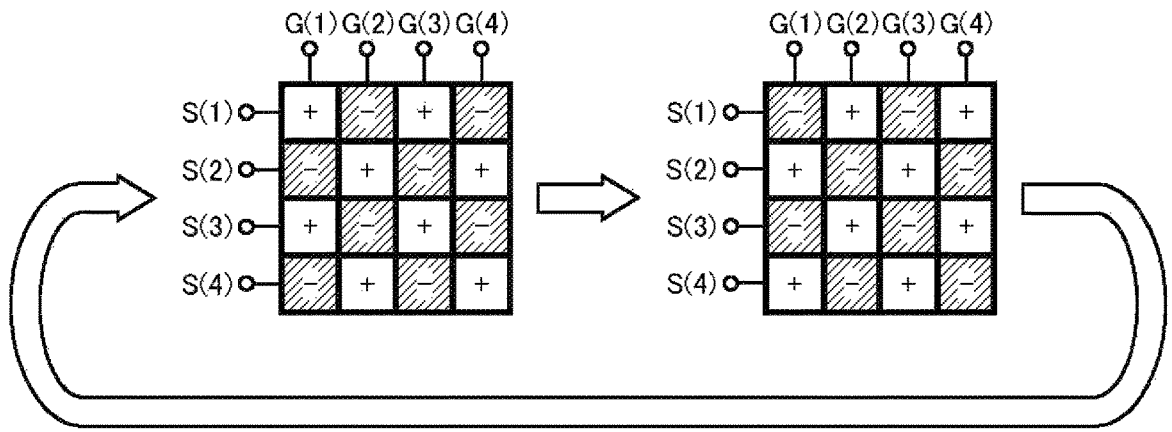
FIG. 7 is a schematic diagram showing dot inversion driving.

Examples of polarity inversion driving include frame inversion driving (FIG. 4), row (horizontal-line) inversion driving (FIG. 5), column (vertical-line) inversion driving (FIG. 6), and dot inversion driving (FIG. 7).

Figure 4:
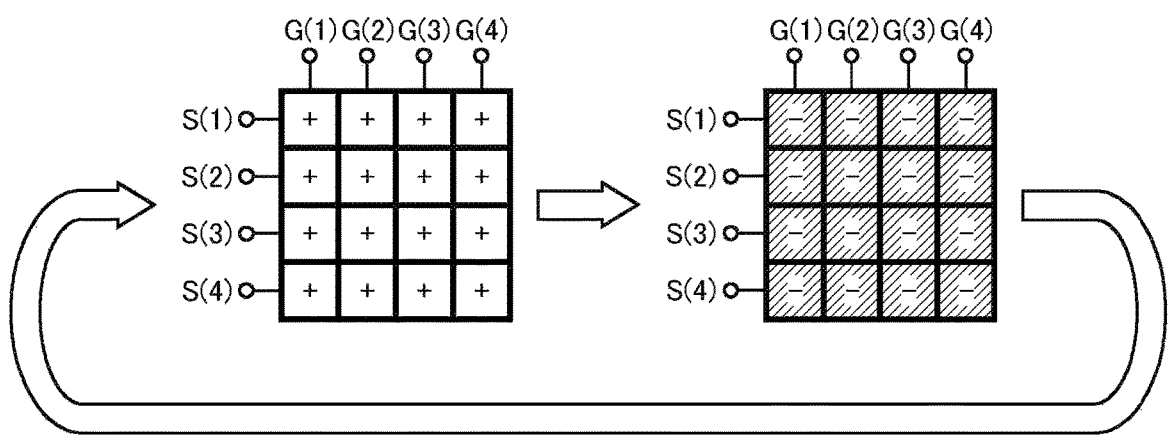
FIG. 4 is a schematic diagram showing frame inversion driving.

In frame inversion driving, as shown in FIG. 4, the voltages applied to all liquid crystal elements have the same polarity, and the polarity is inverted every frame.

Figure 5:
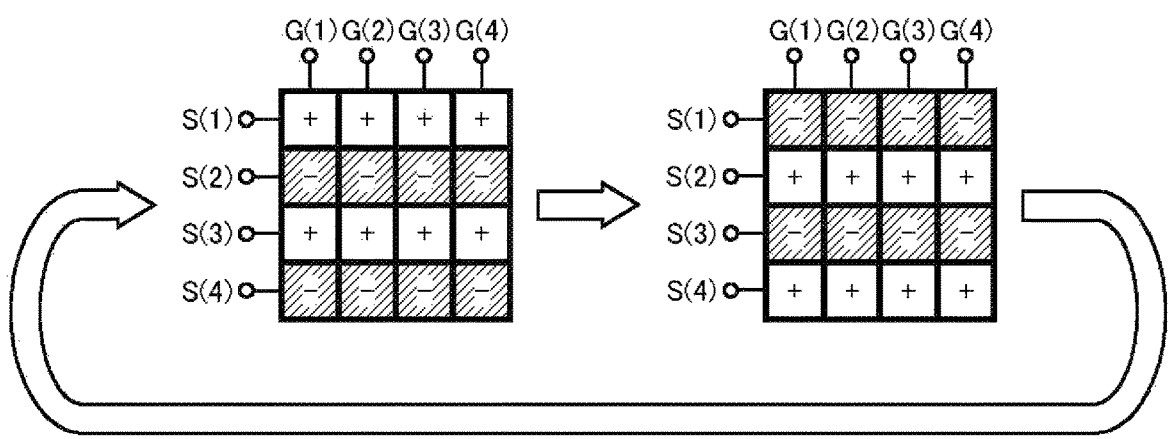
FIG. 5 is a schematic diagram showing row inversion driving.

In row inversion driving, as shown in FIG. 5, the voltages applied to the liquid crystal elements in odd-numbered rows and the voltages applied to the liquid crystal elements in even-numbered rows have opposite polarities, and the polarities are inverted every frame.

In column inversion driving, as shown in FIG. 6, the voltages applied to the liquid crystal elements in odd-numbered columns and the voltages applied to the liquid crystal elements in even-numbered columns have opposite polarities, and the polarities are inverted every frame.

In dot inversion driving, as shown in FIG. 7, the voltages applied to adjacent liquid crystal elements have opposite polarities, and the polarities are inverted every frame.

To follow is a detailed description of the method, attained through intensive studies by the present inventor with an eye on polarity inversion driving mentioned above, for detecting an abnormality in the first source signals S1(*).

<Abnormality Detection Method>

Figure 8:
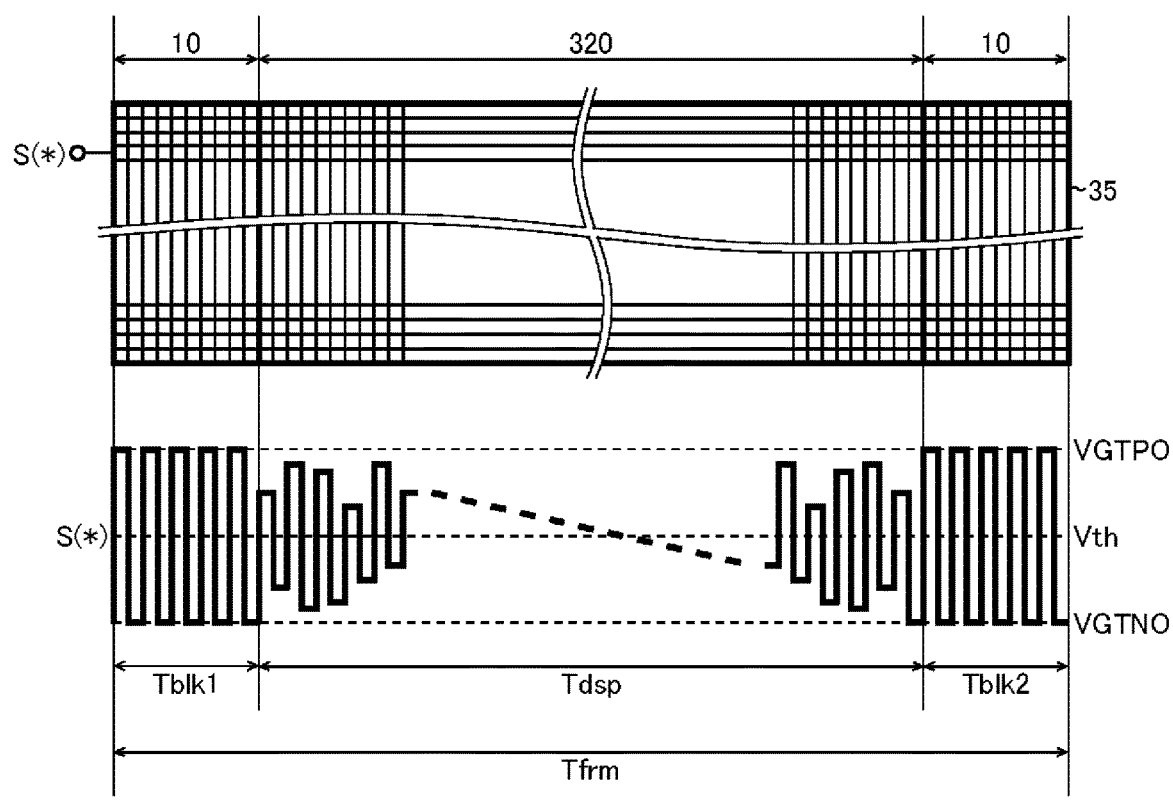
FIG. 8 is a schematic diagram showing a first example of an abnormality detection method.

FIG. 8 is a schematic diagram showing a first example of the abnormality detection method (an abnormality detection method for a case where column inversion driving or dot inversion driving is adopted). In the upper tier of the diagram is schematically shown how the liquid crystal elements of the LCD panel 35 are arrayed in a matrix. In the lower tier of the diagram is schematically shown how the source signal S(*) in the *th row varies as horizontal scanning across the LCD panel 35 progresses. Here, it can be understood that, when the first source signal S1(*) is normal, S(*)=S1(*).

The following description assumes that a source signal S(*) is fed to each row of the LCD panel 35, and that the LCD panel 35 is driven by column inversion driving (FIG. 6) or dot inversion driving (f7).

As shown in the upper tier of the diagram, the LCD panel 35 has not only a display region comprising a plurality of columns (for example, 32 columns) but also, on the left and right sides of it respectively, non-display regions each comprising a plurality of columns (for example, 10 columns each). The non-display regions are not visually recognized by the user, and are used to handle flyback (in the illustrated example, to handle horizontal flyback to return the scanned column from the rightmost one to the leftmost one).

Specifically, the frame period Tfrm for displaying one screen includes a first flyback period Tblk1 corresponding to the non-display region covering the 10 leftmost columns, a display period Tdsp corresponding to the display region covering y columns, and a second flyback period Tblk2 corresponding to the non-display region covering the 10 rightmost columns.

During the display period Tdsp, according to the image to be displayed, the source signal S(*) changes every scanned column over a wide voltage range (VGTNO≤S(*)≤VGTPO). Thus, it is difficult to check whether or not the source signal S(*) is normal based on the result of comparison between the source signal S(*) and the threshold voltage (where VGTNO<Tth<VGTPO).

On the other hand, during the flyback periods Tblk1 and Tblk2, all liquid crystal elements in the non-display regions are displayed black (or white). Accordingly, the source signal S(*) is either at high level (=VGTPO) or at low level (=VGTNO). In particular, in a case where the LCD panel 35 is driven by column inversion driving (FIG. 6) or dot inversion driving (FIG. 7), the polarity of the source signal S(*) is inverted every scanned column during each of the flyback periods Tblk1 and Tblk2. That is, during each of the flyback periods Tblk1 and Tblk2, if the source signal S(*) is normal, periods in which it is at high level (=VGTPO) and periods in which it is at low level (=VGTNO) should occur alternately, five times each.

In view of the just-mentioned behavior, the abnormality detector (chiefly, the logic circuit 40) is configured to watch for an abnormality in the source signal S(*) (that is, the first source signal S1(*)) during at least one of the flyback periods Tblk1 and Tblk2 of the LCD panel 35.

More specifically, during at least one of the flyback periods Tblk1 and Tblk2, the logic circuit 40 monitors the polarity inversion of the source signal S(*) to watch for an abnormality in the source signal S(*). The monitoring of polarity inversion can be carried out by counting pulse edges in the detection signal DET(*) (which corresponds to the result of comparison between the source signal S(*) and the threshold voltage Vth) and checking whether the count value is normal (for example, whether or not the source signal S(*) rises to high level five times during the first flyback period Tblk1).

If, by the abnormality detection method described above, an abnormality is detected in the source signals S(*), then the logic circuit 40, to output the second source signals S2(*) by using the second drivers 60(*), starts one-bit output of the digital video data D2(*). This proceeds as described previously.

Figure 9:
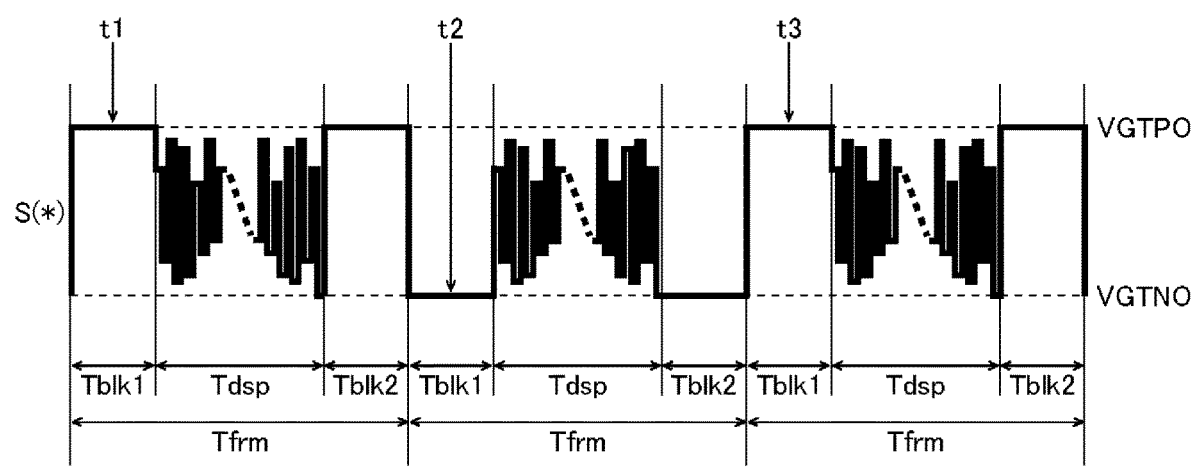
FIG. 9 is a schematic diagram showing a second example of an abnormality detection method.

FIG. 9 is a schematic diagram showing a second example of the abnormality detection method (an abnormality detection method for a case where frame inversion driving or row inversion driving is adopted). In the diagram is schematically shown how the source signal S(*) in the *th row changes over a plurality of frames as horizontal scanning across the LCD panel 35 proceeds.

As shown in the diagram, in a case where the LCD panel 35 is driven by frame inversion driving (FIG. 4) or row inversion driving (FIG. 5), the polarity of the source signal S(*) during the flyback periods Tblk1 and Tblk2 should be inverted every frame period Tfrm.

In view of the just-mentioned behavior, the logic circuit 40 can be configured to detect the logic level of the detection signal DET(*) during every first flyback period Tblk1 (that is, during each of periods t1 to t3) over a plurality of frame periods Tfrm and check whether or not high level (=VGTPO) and low level (=VGTNO) alternate every frame.

The methods described above with reference to FIGS. 8 and 9 deal with examples where an abnormality in the source signals S(*) is detected by monitoring the polarity inversion of the source signals S(*) during at least one of the flyback periods Tblk1 and Tblk2. This, however, is not meant as any limitation to such methods; any other methods can be adopted so long as an abnormality in the source signals S(*) can be detected properly. For example, abnormality detection similar to that described above can be performed in, if there is any, a region within the display region (that is, outside the non-display regions) of the LCD panel 35 that is always displayed black (or white).

<Backing Up Display Regions>

Figure 10:
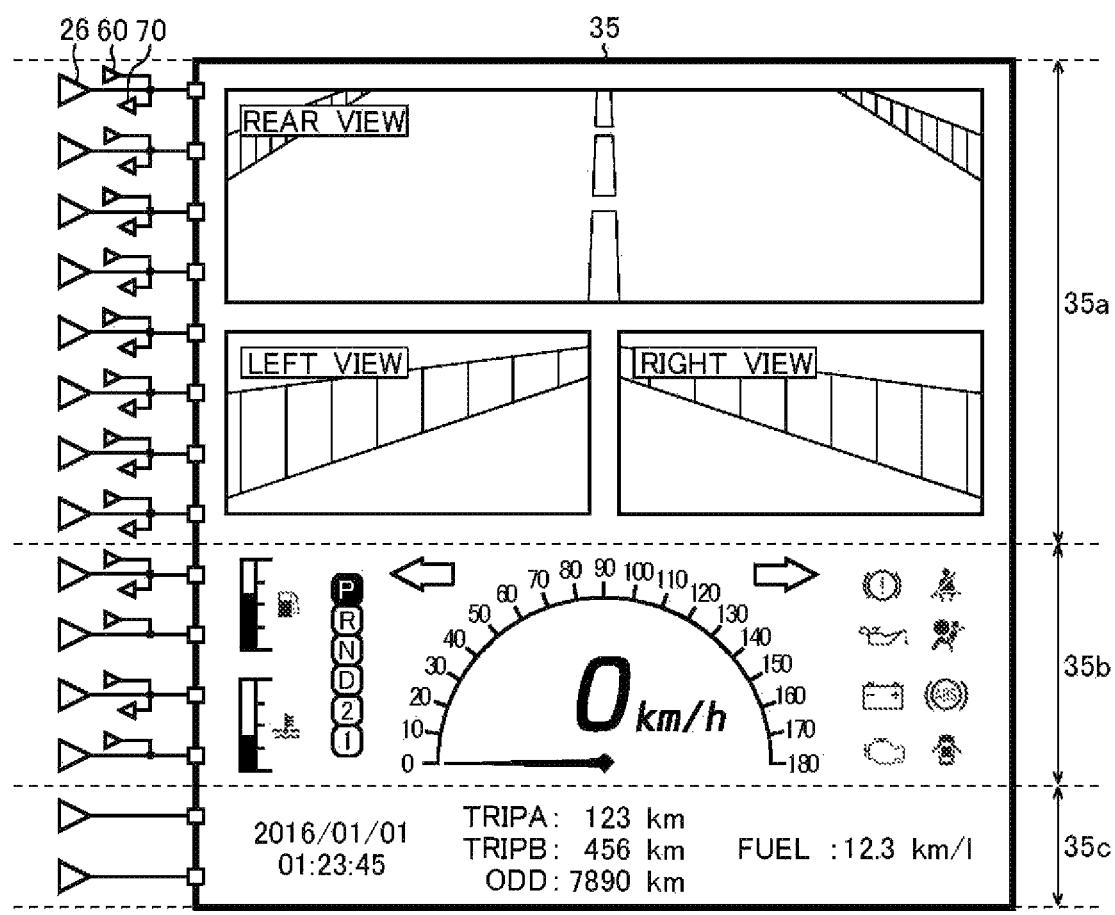
FIG. 10 is a schematic diagram showing an example of how each display region is backed up.

FIG. 10 is a schematic diagram showing an example of how each display region is backed up. The LCD panel 35 shown there divides, according to what is displayed, roughly into a first display region 35a, a second display region 35b, and a third display region 35c.

The first display region 35a is a display region for displaying an image shot by a rear camera installed at the back of a vehicle, images shot by side cameras installed at the left and right sides of the vehicle, and the like. Displaying such shot images on the LCD panel 35 can substitute for conventional rear- and side-view mirrors. A driver can then see the surroundings of the vehicle while hardly moving the line of sight. Thus, in the first display region 35a is displayed information of crucial importance that is essential for the safe traveling of the vehicle. In particular, in the first display region 35a is displayed shot images of the surroundings of the vehicle, and accordingly it is preferable that the image definition there be sufficiently high.

The second display region 35b is a region for displaying a speedometer, direction indicators, the shift position, a fuel gauge, a radiator water temperature gauge, various warning lamps, and the like. Thus, also in the second display region 35b, as in the first display region 35a, is displayed information of crucial importance that is essential for the safe traveling of the vehicle. However, unlike the first display region 35a, in the second display region 35b, no shot images that require a wide range of gradations are displayed. Accordingly, the display definition in the second display region 35b does not has to be so high as in the first display region 35a.

The third display region 35c is a region for displaying the current date and time, a trip meter, an odometer, a fuel economy gauge, and the like. Thus, in the third display region 35c is displayed information of minor importance for the safe traveling of the vehicle.ad Here, to the LCD panel 35, the first drivers 26(*) for a plurality of channels are connected. Ideally, it is preferable that also the second drivers 60(*), and also the output monitors 70(*), be provided to correspond to all channels. However, with consideration given to the chip size, cost, and the like of the LCD driver 20, there can be a case where the second drivers 60(*) and the output monitors 70(*) cannot be provided to correspond to the first drivers 26(*) for all channels.

In such a case, as shown in FIG. 10, it is preferable that the LCD panel 35 be divided roughly into a plurality of display regions and that the number of channels for which to provide the second drivers 60(*) and the output monitors 70(*) be set for each divided display region. Also for emergency display after the detection of an abnormality in the source signals S(*), it is preferable that what to display be set for each divided display region.

For example, it is preferable that, in the first display region 35a for displaying shot images around the vehicle, the second drivers 60(*) and the output monitors 70(*) be provided for all channels. With the output monitors 70(*) provided for all channels in this way, irrespective of which channel an abnormality is detected in, it is possible to switch, without delay, to backup operation using the second drivers 60(*). With the second drivers 60(*) provided for all channels, during the just-mentioned backup operation, it is possible to perform emergency display without a single dead line.

In emergency display on detection of an abnormality, for example, it is possible to switch only an abnormal channel to backup operation, or to switch all channels to backup operation. The former scheme is effective in a case where only a few channels have an abnormality (for example, in a case where a surge applied to an external output terminal T(*) has caused an abnormality in a few second drivers 60(*)), and the latter scheme is effective in a case where many channels have an abnormality (for example, in a case where a surge applied to the external terminal T51 or T52 has caused an abnormality in the buffer 51 or 52).

However, the second drivers 60(*) can only output second source signals S2(*) of two gradations. Accordingly, when all channels of the first display region 35a are switched to backup operation, the entire shot images around the vehicle are displayed in black and white or in eight colors, resulting in greatly reduced viewability. In view of this, in a case where all channels of the first display region 35a are switched to backup operation, it is preferable to display, in place of shot images around the vehicle, a previously prepared warning screen in black and white or in eight colors. The warning screen can show, for example, a message indicating the occurrence of a fault or contact information of the nearest dealer.

On the other hand, in the second display region 35b for displaying the speedometer and the like, it is possible, for example, to provide the second drivers 60(*) for all channels while providing the output monitors 70(*) for one-half of the channels.

With this configuration, even if an abnormality occurs in a channel for which no output monitor 70(*) is provided, no switching to backup operation takes place; thus, a dead line appears in the second display region 35b. This, however, does not pose a major problem because what is displayed in the second display region 35b can all be sufficiently viewable even with a few dead lines.

On the other hand, for example, when the buffer 51 or 52 is destroyed by a surge, an abnormality occurs also in the channels for which the output monitors 70(*) are provided; thus, switching to backup operation takes place without delay. Accordingly, even if part of the output monitors 70(*) fail, the second display region 35b is unlikely to go into a state where nothing that is being displayed there is visually recognizable. In the second display region 35b where no shot images that require a wide range of gradations are displayed, it is sufficient to display there, after conversion into black-and-white or eight-color images, what is originally supposed to be displayed there.

In the third display region 35c for displaying the current date and time and the like, it is even possible, though in rather an extreme example, to provide no second drivers 60(*) nor output monitors 70(*) at all. With this configuration, for example, when the buffer 51 or 52 is destroyed by a surge, nothing that is being displayed in the third display region 35c is visually recognizable any longer. However, what is displayed in the third display region 35c is all information that is not quite essential for safe traveling of the vehicle. Thus, the situation, though causing certain inconvenience, does not pose any major problem to safe travelling of the vehicle.

Needless to say, what is shown in the diagram is merely an example; for the backing-up of each display region, any configuration and operation can freely be adopted.

<Vehicle-Mounted Display>

Figure 11:
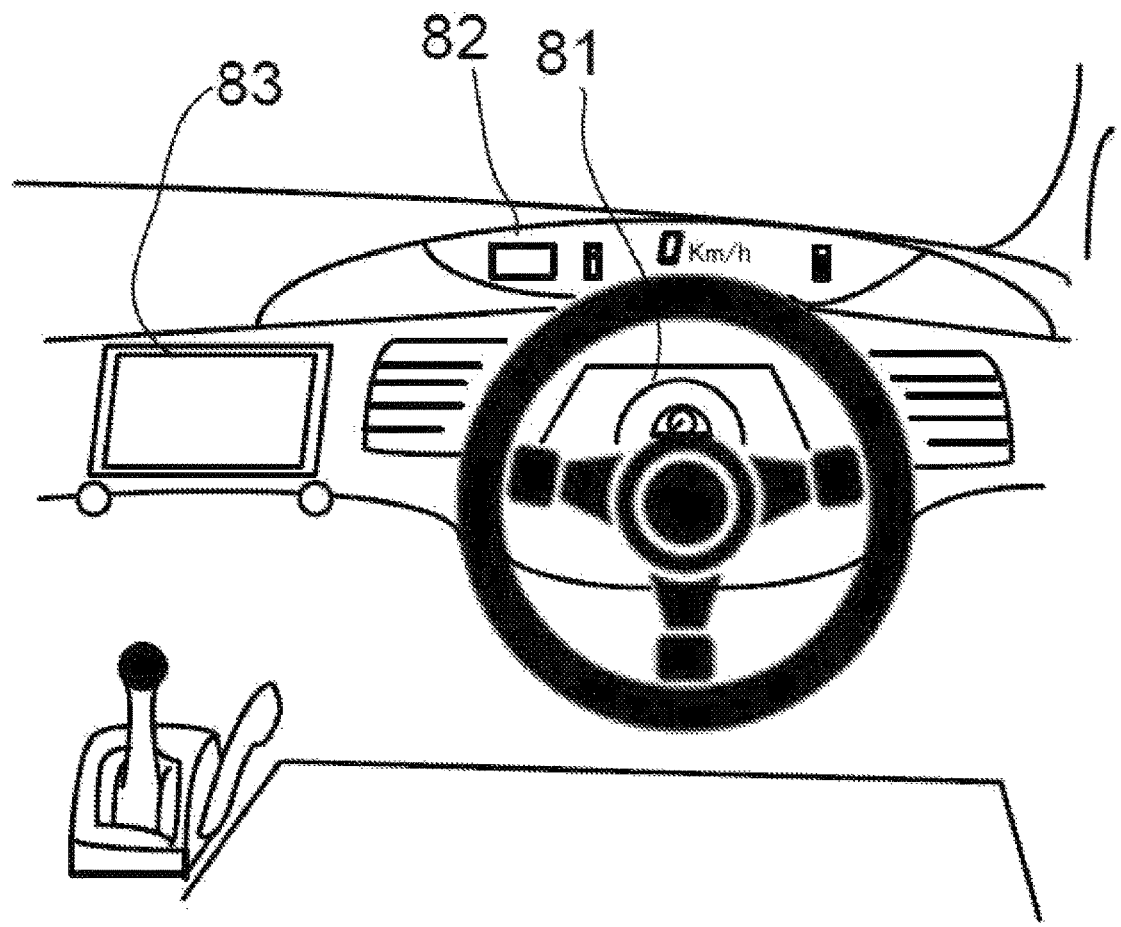
FIG. 11 is a diagram showing a layout around a driver's seat, showing an example of vehicle-mounted displays.

The liquid crystal display device 1 described above is suitable for use as a vehicle-mounted display in particular. A vehicle-mounted display is installed, for example, like the vehicle-mounted displays 81 to 83 shown in FIG. 11, on a dashboard in front of the driver's seat in a vehicle.

For example, the vehicle-mounted display 81 functions as an instrument panel (an indicator panel built in the dashboard) that shows a speedometer, a tachometer, and the like. The vehicle-mounted display 82 shows a fuel gauge, a fuel economy gauge, the shift position, and the like. The vehicle-mounted display 83 has a navigating function to show information on the current position of the vehicle, the route to a destination, and the like, and has also a rear-monitoring function to show a shot image rearward of the vehicle.

As mentioned above, modern vehicles have come to be equipped with, in addition to a conventional car navigation device, applications such as an instrumental panel that shows everything on a liquid crystal panel and a rear monitor that shows an image rearward of a vehicle; vehicle-mounted displays have increasingly wide application. Accordingly, the information displayed on the vehicle-mounted displays 81 to 83 is becoming increasingly important to the driver, and for safe traveling of the vehicle, the vehicle-mounted displays 81 to 83 are required to have ever higher reliability.

In this respect, with the liquid crystal display device 1 described above, since a fail-safe design is aimed at in terms of reliability, even if some fault occurs, it does not lead to any such critical condition as to impair safe traveling of the vehicle.

Modifications and Variations

Although the embodiments described above deal with, as examples, configurations where the present invention is applied to a liquid crystal driving device for driving a vehicle-mounted display, this is not meant to limit the scope of application of the present invention; the present invention finds wide application in liquid crystal driving devices for driving LCD panels in general.

The various technical features disclosed herein may be implemented in any other manner than in the embodiments described above, and allow for many modifications without departing from the spirit of the present invention. That is, the embodiments described above should be understood to be in every aspect illustrative and not restrictive. The technical scope of the present invention is defined not by the description of the embodiments given above but by the appended claims, and should be understood to encompass any modifications made in the sense and scope equivalent to those of the claims.

INDUSTRIAL APPLICABILITY

The invention disclosed herein finds application in, for example, liquid crystal driving devices for driving vehicle-mounted displays.

LIST OF REFERENCE SIGNS 1 liquid crystal display device
10 host controller
20 LCD driver
21 interface
22 command register
23 timing controller
24 data latch
25 source DAC
25(*) DAC
26 source driver
26(*) first driver
27 DC-DC converter
28 charge pump
29 gate driver
30 regulator
31 common voltage generator
32 gamma voltage generator
33 abnormality detector
35 liquid crystal panel
35a, 35b, 35c display region
40 logic circuit
50 EVR
51, 52 buffer
53 gradation voltage generator
60(*) second driver (inverter)
70(*) output monitor (Schmitt buffer)
81-83 vehicle-mounted display
T(*) external output terminal
T1, T2 external terminal
C1, C2 capacitor

The invention claimed is:

1. A liquid crystal driving device having integrated together:
   an external output terminal to which a source line of a liquid crystal display panel is externally connected;
   a first driver configured to generate, and output to the external output terminal, a first source signal of three or more gradations;
   an abnormality detector configured to detect an abnormality in the first source signal; and
   a second driver configured to generate, and output to the external output terminal, a second source signal of two gradations when an abnormality is detected in the first source signal.

2. The liquid crystal driving device according to claim 1, wherein
   The abnormality detector is configured to detect an abnormality in the first source signal during a flyback period of the liquid crystal display panel.

3. The liquid crystal driving device according to claim 2, wherein
   the liquid crystal display panel is driven by predetermined polarity inversion driving, and the abnormality detector is configured to detect an abnormality in the first source signal by monitoring polarity inversion of the first source signal during the flyback period.

4. The liquid crystal driving device according to claim 3, wherein
the predetermined polarity inversion driving is one of frame inversion driving, row inversion driving, column inversion driving, and dot inversion driving.

5. The liquid crystal driving device according to claim 1, wherein
the second driver has a higher withstand voltage than the first driver.

6. The liquid crystal driving device according to claim 1, further having integrated together:
a first buffer configured to receive a first input voltage and output a first output voltage;
a second buffer configured to receive a second input voltage and output a second output voltage;
a first external terminal via which a first capacitor is externally connected to an output terminal of the first buffer;
a second external terminal via which a second capacitor is externally connected to an output terminal of the second buffer;
a gradation voltage generator configured to receive the first and second output voltages and generate a gradation voltage; and
a DAC configured to convert digital video data into an analog video signal by using the gradation voltage and feed the analog video signal to the first driver.

7. The liquid crystal driving device according to claim 6, wherein
the second driver is configured to operate by being supplied with the first and second input voltages without the first and second input voltages passing through either of the first and second buffers.

8. The liquid crystal driving device according to claim 1, wherein
the first driver comprises a plurality of first drivers, and the second driver and the abnormality detector are provided to correspond to at least one of the plurality of first drivers.

9. A liquid crystal display device comprising:
the liquid crystal driving device according to claim 1; and
a liquid crystal display panel that is driven by the liquid crystal driving device.

10. A vehicle comprising the liquid crystal display device according to claim 9.

* * * * *